(12) United States Patent
Furuya et al.

(10) Patent No.: US 12,716,907 B2
(45) Date of Patent: Aug. 25, 2026

(54) AUTOMATIC ANALYSIS DEVICE

(71) Applicant: HITACHI HIGH-TECH CORPORATION, Tokyo (JP)

(72) Inventors: Miki Furuya, Tokyo (JP); Emiko Ushiku, Tokyo (JP); Masahiko Iijima, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 1152 days.

(21) Appl. No.: 17/616,351

(22) PCT Filed: Mar. 9, 2020

(86) PCT No.: PCT/JP2020/009921

§ 371 (c)(1),
(2) Date: Dec. 3, 2021

(87) PCT Pub. No.: WO2020/261656

PCT Pub. Date: Dec. 30, 2020

(65) Prior Publication Data

US 2022/0326270 A1 Oct. 13, 2022

(30) Foreign Application Priority Data

Jun. 26, 2019 (JP) ................................ 2019-118743

(51) Int. Cl.
*G01N 35/10* (2006.01)
*G01N 21/25* (2006.01)
*G01N 35/04* (2006.01)

(52) U.S. Cl.
CPC ....... *G01N 35/1016* (2013.01); *G01N 21/253* (2013.01); *G01N 35/04* (2013.01);
(Continued)

(58) Field of Classification Search
CPC .. G01N 35/1016; G01N 21/253; G01N 35/04; G01N 2035/0443;
(Continued)

(56) References Cited

U.S. PATENT DOCUMENTS 6,284,472 B1 * 9/2001 Wei ........................ G01N 33/53
436/805
2004/0033611 A1 2/2004 Lundsgaard et al.
(Continued)

FOREIGN PATENT DOCUMENTS

CN 108700602 A 10/2018
JP 04-145363 A 5/1992
(Continued)

OTHER PUBLICATIONS

International Search Report of PCT/JP2020/009921 dated Jun. 9, 2020.

(Continued)

*Primary Examiner* — Christine T Mui
(74) *Attorney, Agent, or Firm* — MATTINGLY & MALUR, PC

(57) ABSTRACT

An ISE measurement unit that measures the electrolyte concentration of a sample, a spectrophotometer that measures biochemical parameters of a sample, a pH measurement mechanism that measures the pH of a sample ,sample dispensing mechanisms that dispense the sample for measurement in the ISE measurement unit or the spectrophotometer from a container that contains the sample; and a conveyance mechanism that conveys the container. The conveyance mechanism, the sample dispensing mechanisms, and the pH measurement mechanism are disposed such that the dispensing of the sample by the pH measurement mechanism for pH measurement, or pH measurement, is performed after the dispensing of the sample by the sample dispensing mechanisms.

9 Claims, 7 Drawing Sheets

(52) U.S. Cl.
CPC ................ *G01N 2035/0443* (2013.01); *G01N 2035/0444* (2013.01); *G01N 2201/0423* (2013.01)

(58) Field of Classification Search
CPC ... G01N 2035/0444; G01N 2201/0423; G01N 35/1009; G01N 2035/0412; G01N 2201/0415
USPC ...................................................... 422/63, 50
See application file for complete search history.

(56) References Cited

U.S. PATENT DOCUMENTS

| | | | | |
|---|---|---|---|---|
| 2012/0318076 A1* | 12/2012 | Kappelhoff | ........ | G01N 35/0099 73/864.11 |
| 2014/0273242 A1* | 9/2014 | Ochranek | .......... | G01N 33/5302 422/65 |

FOREIGN PATENT DOCUMENTS

| | | |
|---|---|---|
| JP | 05-172828 A | 7/1993 |
| JP | 06-54319 A | 7/1994 |
| JP | 2009-174997 A | 8/2009 |

OTHER PUBLICATIONS

Extended European Search Report received in corresponding European Application No. 20831954.1 dated Jul. 4, 2023.

International Preliminary Report on Patentability received in corresponding International Application No. PCT/JP2020/009921 dated Jan. 6, 2022.

Chinese Office Action received in corresponding Chinese Application No. 202080046056.4 dated May 29, 2025.

* cited by examiner

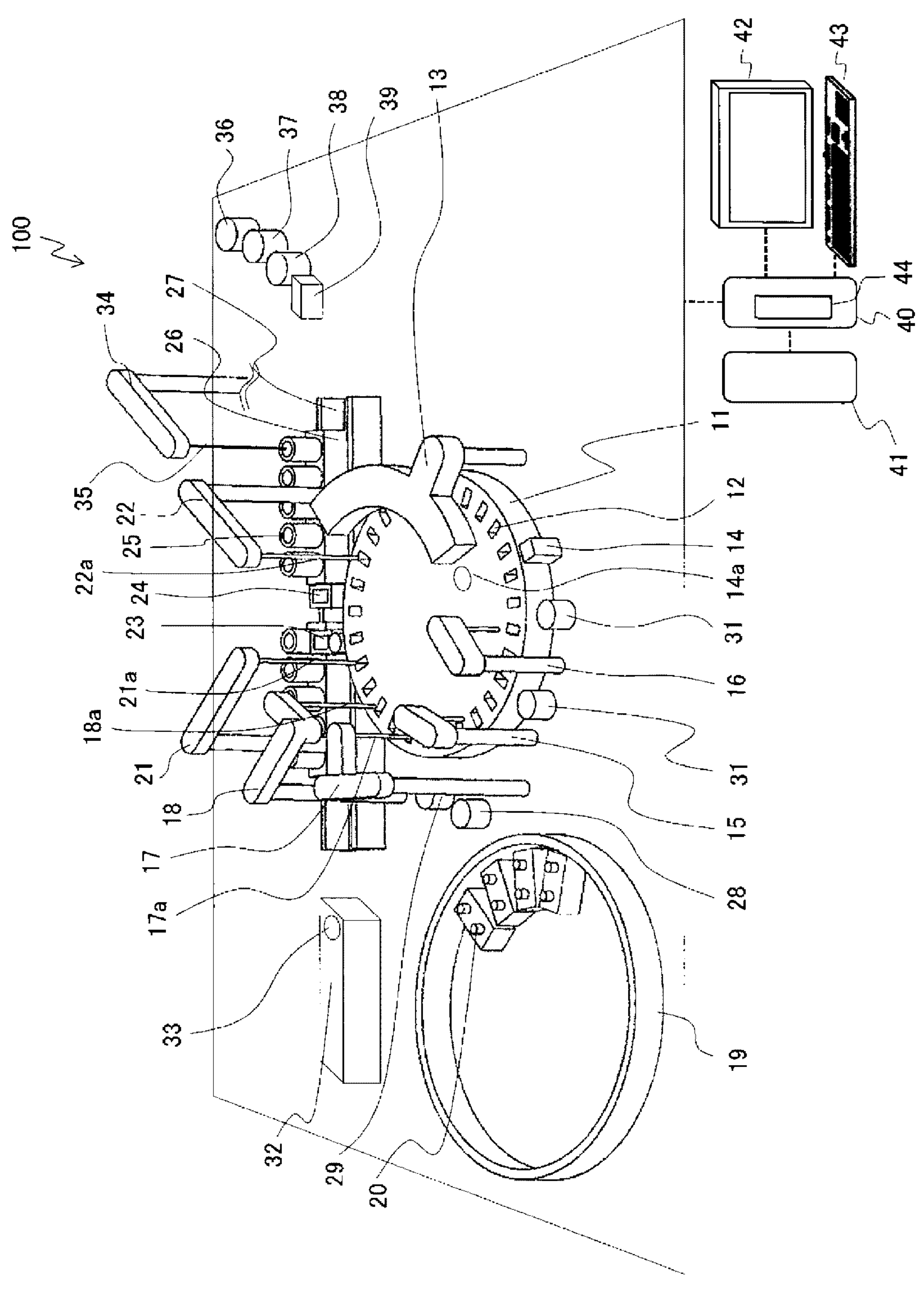
[FIG. 1]

[FIG. 2]
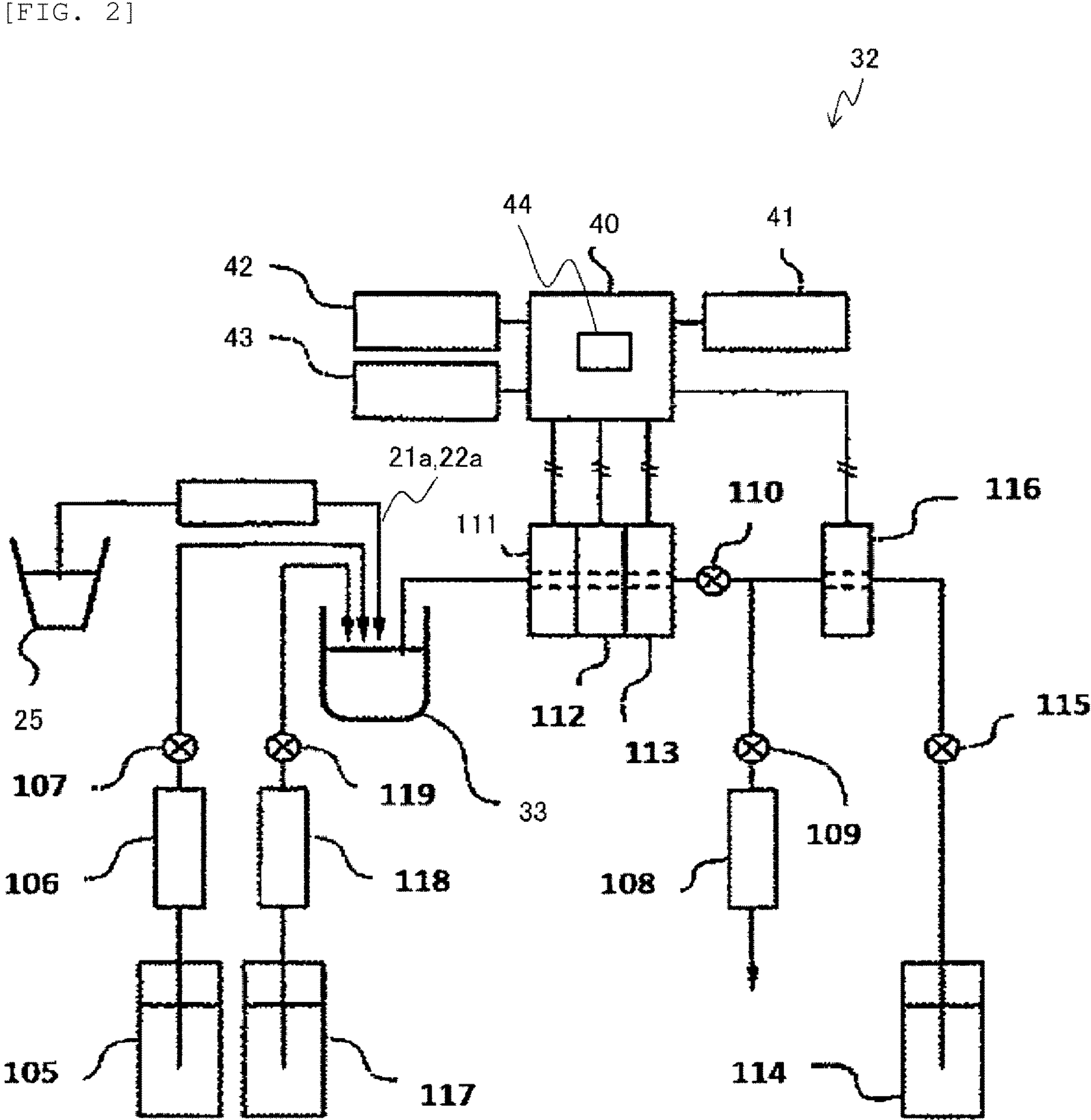

[FIG. 3]
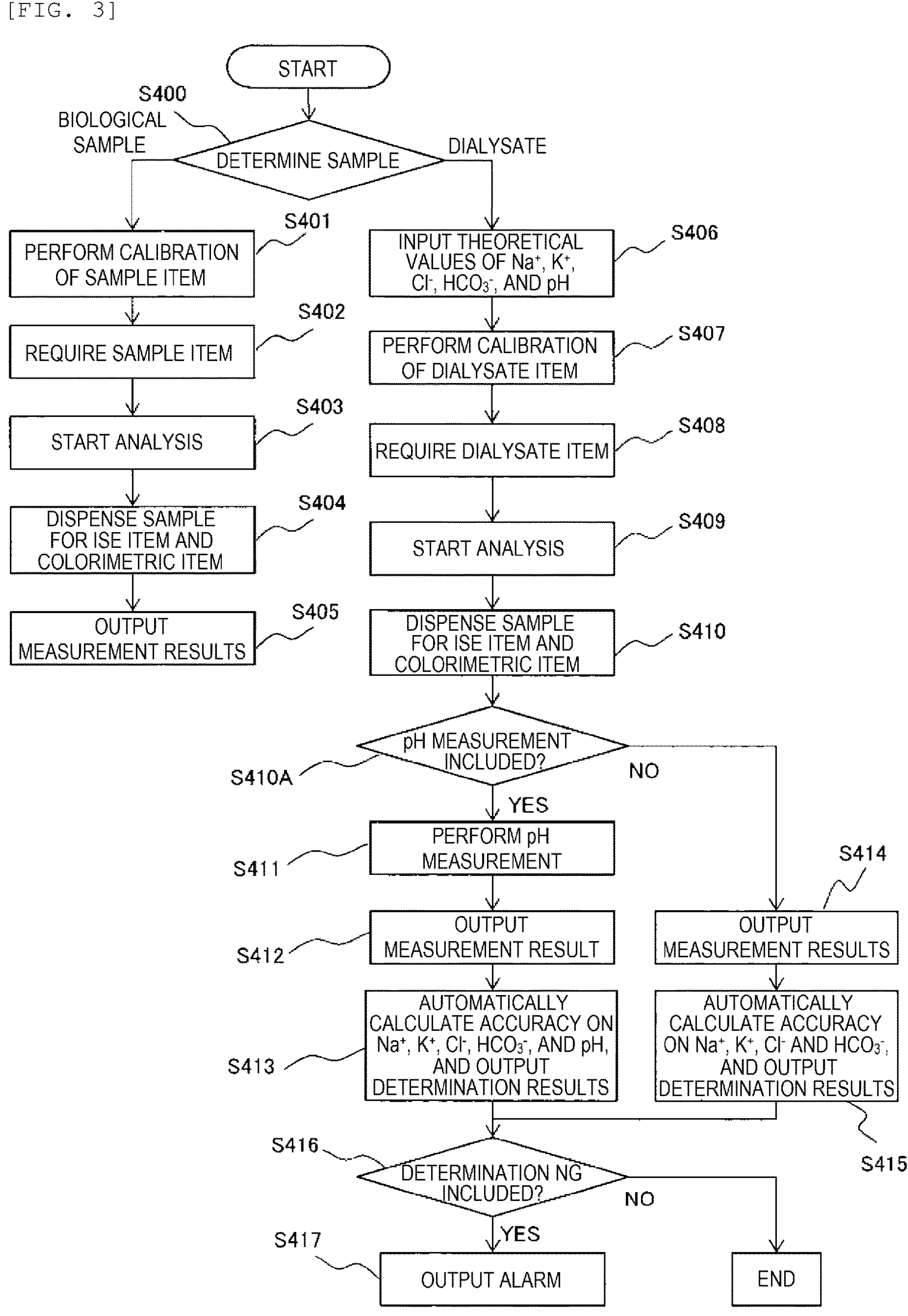

Figures 4, 5:
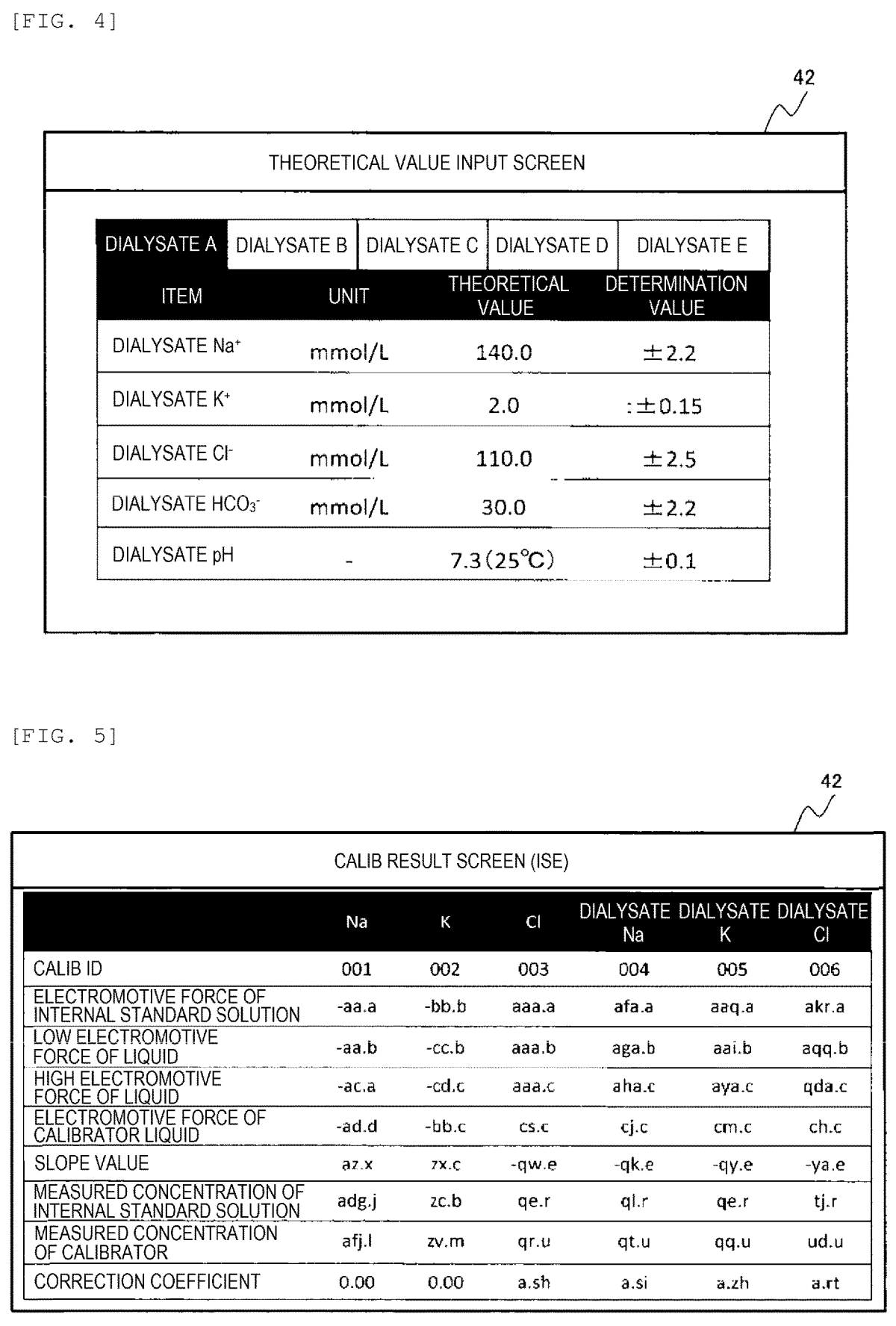

THEORETICAL VALUE INPUT SCREEN

DIALYSATE A | DIALYSATE B | DIALYSATE C | DIALYSATE D | DIALYSATE E

| ITEM | UNIT | THEORETICAL VALUE | DETERMINATION VALUE |
|---|---|---|---|
| DIALYSATE $Na^+$ | mmol/L | 140.0 | ±2.2 |
| DIALYSATE $K^+$ | mmol/L | 2.0 | :±0.15 |
| DIALYSATE $Cl^-$ | mmol/L | 110.0 | ±2.5 |
| DIALYSATE $HCO_3^-$ | mmol/L | 30.0 | ±2.2 |
| DIALYSATE pH | - | 7.3 (25° C.) | ±0.1 |

CALIB RESULT SCREEN (ISE)

| | Na | K | Cl | DIALYSATE Na | DIALYSATE K | DIALYSATE Cl |
|---|---|---|---|---|---|---|
| CALIB ID | 001 | 002 | 003 | 004 | 005 | 006 |
| ELECTROMOTIVE FORCE OF INTERNAL STANDARD SOLUTION | -aa.a | -bb.b | aaa.a | afa.a | aaq.a | akr.a |
| LOW ELECTROMOTIVE FORCE OF LIQUID | -aa.b | -cc.b | aaa.b | aga.b | aai.b | aqq.b |
| HIGH ELECTROMOTIVE FORCE OF LIQUID | -ac.a | -cd.c | aaa.c | aha.c | aya.c | qda.c |
| ELECTROMOTIVE FORCE OF CALIBRATOR LIQUID | -ad.d | -bb.c | cs.c | cj.c | cm.c | ch.c |
| SLOPE VALUE | az.x | 7x.c | -qw.e | -qk.e | -qy.e | -ya.e |
| MEASURED CONCENTRATION OF INTERNAL STANDARD SOLUTION | adg.j | zc.b | qe.r | ql.r | qe.r | tj.r |
| MEASURED CONCENTRATION OF CALIBRATOR | afj.l | zv.m | qr.u | qt.u | qq.u | ud.u |
| CORRECTION COEFFICIENT | 0.00 | 0.00 | a.sh | a.si | a.zh | a.rt |

Figures 6, 7:
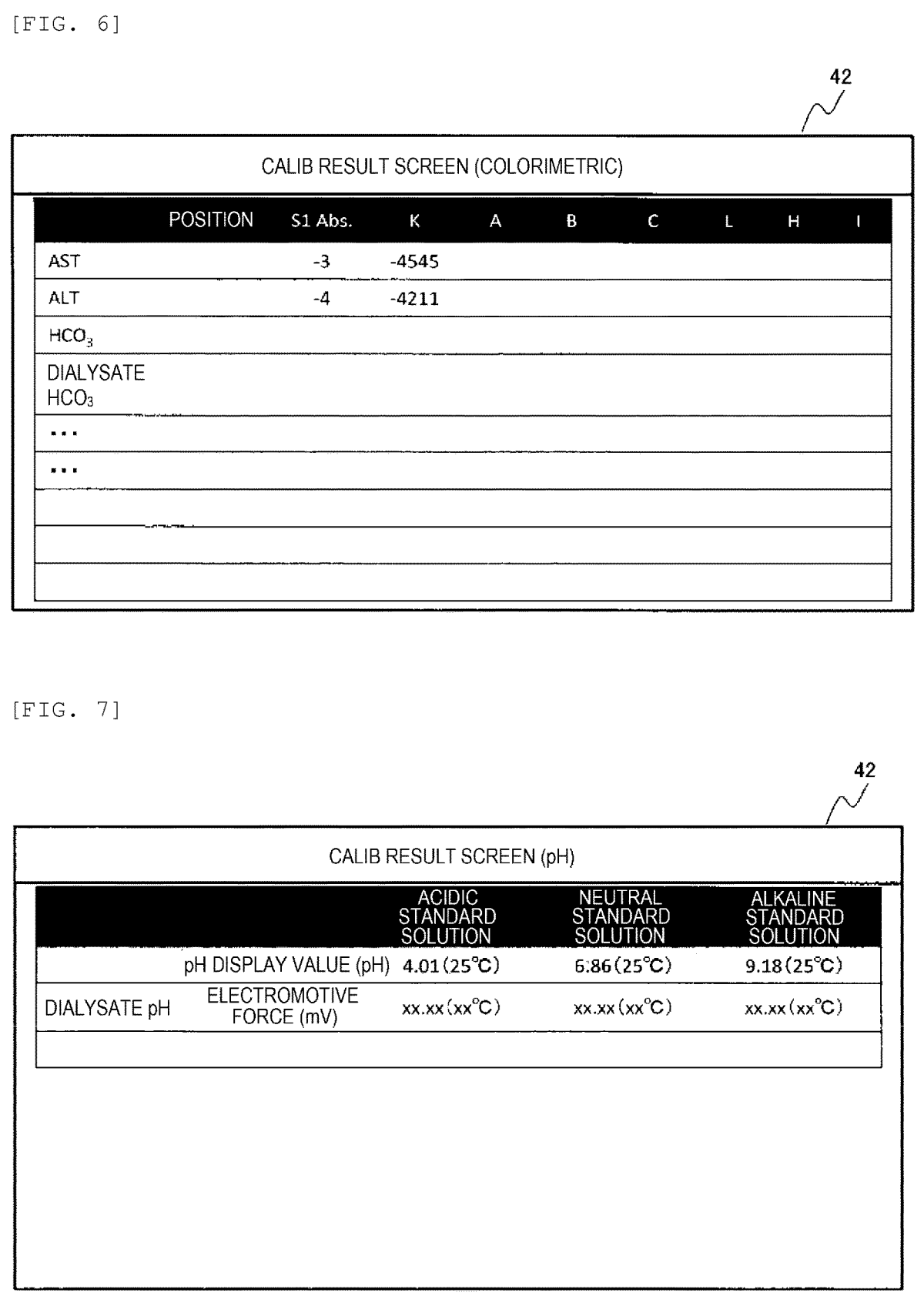

CALIB RESULT SCREEN (COLORIMETRIC)

| POSITION | S1 Abs. | K | A | B | C | L | H | I |
|---|---|---|---|---|---|---|---|---|
| AST | -3 | -4545 | | | | | | |
| ALT | -4 | -4211 | | | | | | |
| $HCO_3$ | | | | | | | | |
| DIALYSATE $HCO_3$ | | | | | | | | |
| ... | | | | | | | | |
| ... | | | | | | | | |
| | | | | | | | | |
| | | | | | | | | |
| | | | | | | | | |

CALIB RESULT SCREEN (pH)

| | | ACIDIC STANDARD SOLUTION | NEUTRAL STANDARD SOLUTION | ALKALINE STANDARD SOLUTION |
|---|---|---|---|---|
| | pH DISPLAY VALUE (pH) | 4.01 (25° C.) | 6.86 (25° C.) | 9.18 (25° C.) |
| DIALYSATE pH | ELECTROMOTIVE FORCE (mV) | xx.xx (xx° C.) | xx.xx (xx° C.) | xx.xx (xx° C.) |
| | | | | |

Figures 8, 9:
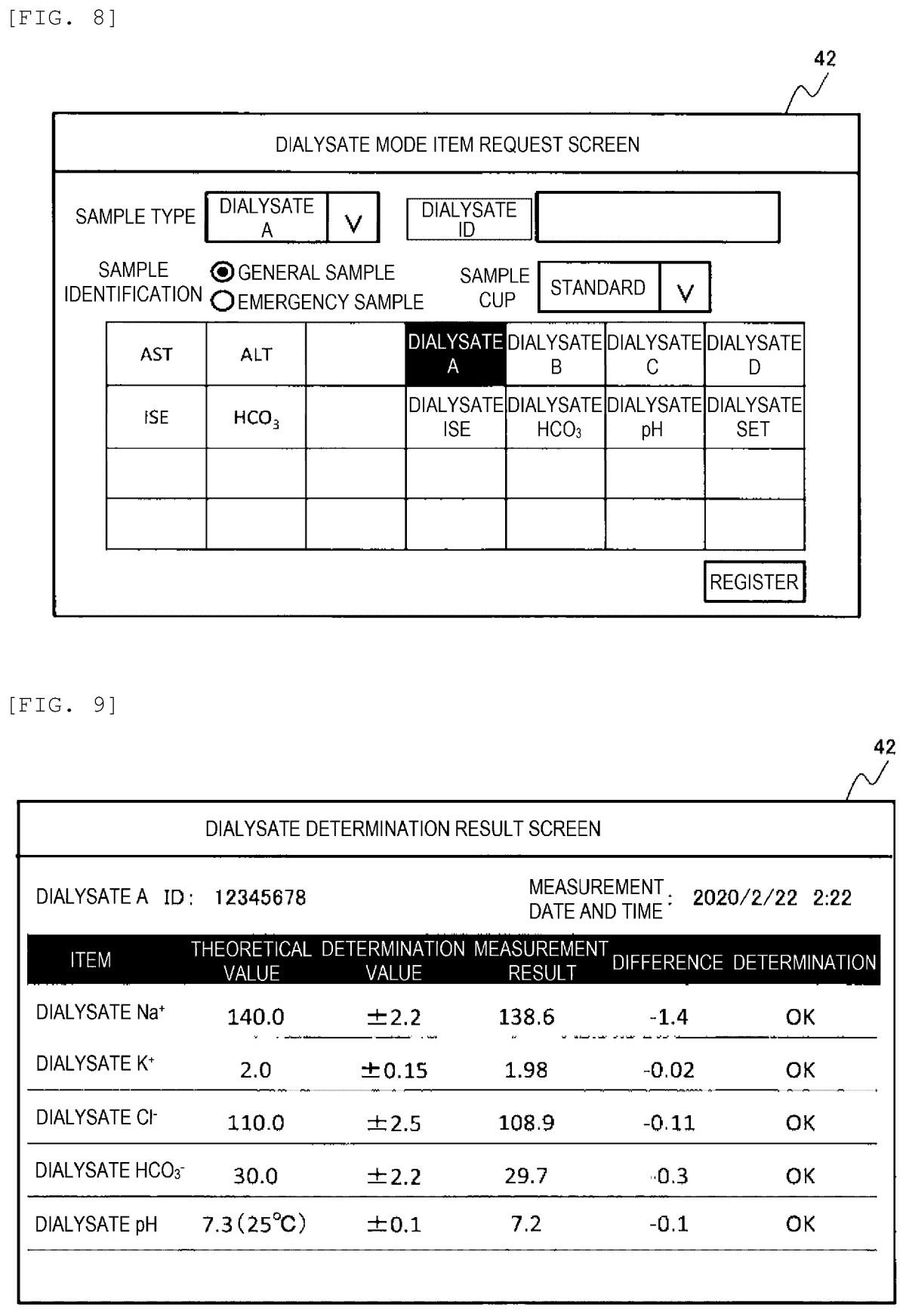

DIALYSATE MODE ITEM REQUEST SCREEN

SAMPLE TYPE: DIALYSATE A (V)
DIALYSATE ID:

SAMPLE IDENTIFICATION: ◉ GENERAL SAMPLE / ○ EMERGENCY SAMPLE
SAMPLE CUP: STANDARD (V)

| AST | ALT | | DIALYSATE A | DIALYSATE B | DIALYSATE C | DIALYSATE D |
|---|---|---|---|---|---|---|
| ISE | $HCO_3$ | | DIALYSATE ISE | DIALYSATE $HCO_3$ | DIALYSATE pH | DIALYSATE SET |
| | | | | | | |
| | | | | | | |

REGISTER

DIALYSATE DETERMINATION RESULT SCREEN

DIALYSATE A ID: 12345678

MEASUREMENT DATE AND TIME: 2020/2/22 2:22

| ITEM | THEORETICAL VALUE | DETERMINATION VALUE | MEASUREMENT RESULT | DIFFERENCE | DETERMINATION |
|---|---|---|---|---|---|
| DIALYSATE $Na^+$ | 140.0 | ±2.2 | 138.6 | -1.4 | OK |
| DIALYSATE $K^+$ | 2.0 | ±0.15 | 1.98 | -0.02 | OK |
| DIALYSATE $Cl^-$ | 110.0 | ±2.5 | 108.9 | -0.11 | OK |
| DIALYSATE $HCO_3^-$ | 30.0 | ±2.2 | 29.7 | -0.3 | OK |
| DIALYSATE pH | 7.3(25°C) | ±0.1 | 7.2 | -0.1 | OK |

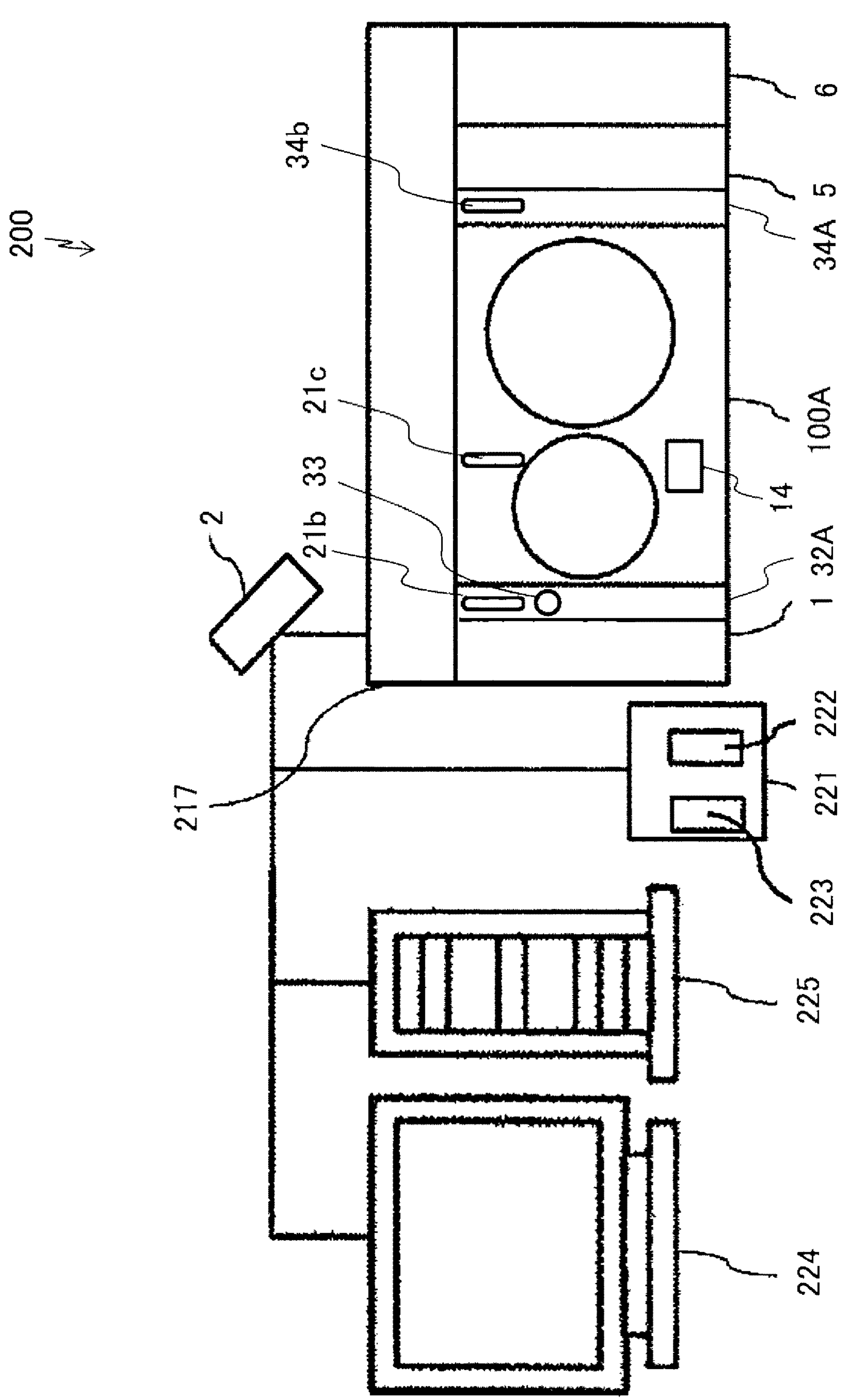
[FIG. 10]
200
2
21b
33
21c
34b
6
5
34A
100A
14
32A
1
217
222
221
223
225
224

AUTOMATIC ANALYSIS DEVICE

TECHNICAL FIELD

The present invention relates to an automatic analysis device that analyzes physical properties of components such as blood.

BACKGROUND ART

As an example of an automatic analysis device that can perform analysis without spoiling the freshness of a sample, PTL 1 describes that a sample identification device configured to detect types of a plurality of samples based on physical or physicochemical properties of a clinical sample without altering the clinical sample, which is connected to a control device, is provided between a collected sample introduction unit of a sample introduction device and a sample dispensing unit.

CITATION LIST

Patent Literature

PTL 1: JP-B-H06-54319

SUMMARY OF INVENTION

Technical Problem

The automatic analysis device is a device configured to qualitatively and quantitatively analyze components contained in a biological sample such as blood and urine by a colorimetric analysis and an ISE measurement.

The colorimetric analysis is an analysis in which qualitative and quantitative analysis is performed by adding and reacting a reagent specifically reacting with a specific component and measuring an absorbance and a luminescence amount of a reaction solution.

Further, the ISE measurement is an analysis that quantitatively analyzes electrolytes such as $Na^+$, $K^+$, and $Cl^-$ contained in the biological sample by using an ion selective electrode.

In an automatic analysis device of related art, a pH measurement unit cannot be provided, if pH is to be measured as well, it is necessary to measure the pH with a separate dedicated device. In addition, an additional sample amount is required.

Further, PTL 1 describes that a pH meter is provided between the sample introduction unit and the dispensing unit, and serum and urine are distinguished by a difference in pH. In the device described in PTL 1, a measurement order is an order of pH and colorimetric analysis.

The automatic analysis device described in PTL 1 has a problem to be solved that in a case where a mode different from that of a biological sample from a patient, for example, a dialysate is used, when the pH measurement is required in addition to colorimetric and ISE items, the pH measurement unit cannot be provided.

In addition, although the pH measurement unit can be provided in PTL 1, the pH is measured before the colorimetric analysis. Here, since subjects of the colorimetric analysis are lipids, enzymes, and immune items, a measurement accuracy higher than that of pH is required.

However, there are problems that since the pH measurement is performed before the colorimetric analysis, there is a concern about accuracies of the colorimetric analysis and an ISE analysis by sample concentration over time, and a carryover may occur due to the pH measurement unit being immersed in the sample as described in PTL 1.

An object of the invention is to provide an automatic analysis device capable of measuring pH without affecting a colorimetric analysis and an ISE analysis and without reducing a processing capability.

Solution to Problem

The invention includes a plurality of means for solving the above problems, and one example is shown as an automatic analysis device for automatically analyzing a sample. The automatic analysis device includes: an electrolyte measurement unit configured to measure an electrolyte concentration of the sample; a colorimetric measurement unit configured to measure a biochemical item of the sample; a pH measurement unit configured to measure pH of the sample; a first dispensing unit configured to perform dispensing of the sample for measurement in at least one of the electrolyte measurement unit and the colorimetric measurement unit from a container containing the sample; and a conveying unit configured to convey the container. The conveying unit, the first dispensing unit and the pH measurement unit are arranged such that a dispensing of the sample for pH measurement by the pH measurement unit or the pH measurement is performed after dispensing of the sample by the first dispensing unit.

Further, another example is shown as an automatic analysis device for automatically analyzing a sample. The automatic analysis device includes: an electrolyte measurement unit configured to measure an electrolyte concentration of the sample; a colorimetric measurement unit configured to measure a biochemical item of the sample; a pH measurement unit configured to measure pH of the sample; a first dispensing unit configured to perform dispensing of the sample for measurement in at least one of the electrolyte measurement unit and the colorimetric measurement unit from a container containing the sample; a conveying unit configured to convey the container; and a control unit configured to control an operation of a mechanism of the automatic analysis device. The control unit controls the conveying unit such that a dispensing of the sample for pH measurement by the pH measurement unit or the pH measurement is performed after dispensing of the sample by the first dispensing unit.

Advantageous Effect

According to the invention, the pH measurement also can be performed without affecting the colorimetric analysis and the ISE analysis and without reducing a processing capability. Problems, configurations, and effects other than those described above will be further clarified with the following description of embodiments.

BRIEF DESCRIPTION OF DRAWINGS

FIG. 1 is a perspective view showing a configuration of an automatic analysis device according to Embodiment 1 of the invention.

FIG. 2 is a diagram showing a schematic configuration of an ISE measurement unit of the automatic analysis device according to Embodiment 1.

FIG. 3 is a flowchart showing an operation of the automatic analysis device according to Embodiment 1.

FIG. 4 is a theoretical value input screen displayed on a display device of the automatic analysis device according to Embodiment 1.

FIG. 5 is an ISE calibration result screen displayed on the display device of the automatic analysis device according to Embodiment 1.

FIG. 6 is a colorimetric calibration result screen displayed on the display device of the automatic analysis device according to Embodiment 1.

FIG. 7 is a pH measurement calibration result screen displayed on the display device of the automatic analysis device according to Embodiment 1.

FIG. 8 is a dialysate mode item request screen displayed on the display device of the automatic analysis device according to Embodiment 1.

FIG. 9 is a dialysate determination result screen displayed on the display device of the automatic analysis device according to Embodiment 1.

FIG. 10 is a diagram schematically showing a configuration of an automatic analysis device according to Embodiment 3 of the invention.

DESCRIPTION OF EMBODIMENTS

Hereinafter, embodiments of an automatic analysis device of the invention will be described with reference to the drawings. In the following embodiments, it is needless to say that constituent elements (including element steps or the like) are not necessarily essential unless otherwise particularly specified or in principle considered to be obviously essential.

In addition, a sample of the invention which is a subject to be measured by each analysis unit and analysis module to be described later includes, in addition to biological samples such as serum and urine, liquids such as a dialysate which is different from the biological samples.

Embodiment 1

Embodiment 1 of the automatic analysis device of the invention will be described with reference to FIGS. 1 to 9.

First, a schematic overall configuration of the automatic analysis device according to the present embodiment will be described with reference to FIG. 1. FIG. 1 is a perspective view showing an overall configuration of an automatic analysis device according to one embodiment of the invention.

An automatic analysis device 100 shown in FIG. 1 is a device configured to automatically analyze a sample, and mainly includes a conveyance mechanism 27, a reaction disk 11, a reagent disk 19, sample dispensing mechanisms 21 and 22, reagent dispensing mechanisms 17 and 18, stirring mechanisms 15 and 16, a spectrophotometer 14, cleaning tanks 23, 24, 28, 29 and 31, a cleaning mechanism 13, an ISE measurement unit 32, a pH measurement mechanism 34, a cleaning tank 39, and a control device 40.

The conveyance mechanism 27 is provided adjacent to the reaction disk 11, and is a device that conveys a sample storage container 26 that is introduced from a sample rack introduction unit (not shown) and mounted with a plurality of sample containers 25 containing samples to dispensing positions of the sample dispensing mechanisms 21 and 22 or a pH measurement position by the pH measurement mechanism 34, and carries out the sample storage container 26 for which the measurement is completed.

In the present embodiment, although an example in which the plurality of sample containers 25 are mounted on the sample storage container 26 is described, at least one sample container 25 can be mounted on the sample storage container 26. A sample holder on which one sample container 25 is mounted, a sample rack on which the plurality of sample containers 25 are mounted, or the like is shown as an example of the sample storage container 26.

The reaction disk 11 stores a plurality of reaction vessels 12 for reacting a sample such as blood or urine with a reagent in a state where the reaction vessels are separated from each other at predetermined intervals along a circumferential direction thereof.

The reagent disk 19 is a storage chamber in which a plurality of reagent bottles 20 containing the reagents can be contained in a circumferential shape. The reagent disk 19 is kept cold.

The sample dispensing mechanisms 21 and 22 are provided between the reaction disk 11 and the conveyance mechanism 27, and are configured to be rotatable in an arc shape and vertically movable. Sample probes 21*a* and 22*a* are provided at tips of the sample dispensing mechanisms 21 and 22, respectively.

The sample probes 21*a* and 22*a* perform various dispensing operations of aspirating the sample for measurement by the ISE measurement unit 32 from the sample container 25 and discharging the sample to a dilution tank 33 of the ISE measurement unit 32, and of aspirating the sample for measurement by the spectrophotometer 14 from the sample container 25 or the reaction vessel 12 and discharging the sample to the reaction vessel 12 by moving while drawing an arc around rotation axes of the sample dispensing mechanisms 21 and 22.

The reagent dispensing mechanisms 17 and 18 are provided adjacent to the reaction disk 11 and the reagent disk 19, and are configured to be rotatable in an arc shape and vertically movable, and tips thereof are provided with reagent probes 17*a* and 18*a*.

The reagent probes 17*a* and 18*a* perform a dispensing operation of aspirating the reagent from the reagent bottle 20 and discharging the reagent to the reaction vessel 12 by moving while drawing an arc around rotation axes of the reagent dispensing mechanisms 17 and 18.

The stirring mechanisms 15 and 16 include, for example, a stirring blade or a spatula-shaped rod (not shown) provided at tips thereof, and stir by infiltrating the stirring blade or rod into a reaction solution, which is a mixture of the sample and the reagent in the reaction vessel 12, and rotating the stirring blade or rod. In addition, the stirring mechanisms 15 and 16 are not limited to such a mechanism, and may be a mechanism using ultrasonic waves.

The spectrophotometer 14 is a device configured to measure a reaction process of the reaction solution obtained by reacting the sample with the reagent in the reaction vessel 12 or optical properties after the reaction, and is oppositely arranged so as to sandwich the reaction vessel 12 with respect to a light source 14*a* arranged inside the reaction disk 11.

The cleaning mechanism 13 is a device configured to clean the reaction vessel 12 after the measurement is completed.

The cleaning tanks 28 and 29 configured to clean the reagent probes 17*a* and 18*a* of the reagent dispensing mechanisms 17 and 18 are provided between the reaction disk 11 and the reagent disk 19. In addition, the cleaning tanks 23 and 24 configured to clean the sample probes 21*a* and 22*a* of the sample dispensing mechanisms 21 and 22 are provided between the reaction disk 11 and the conveyance mechanism 27. Further, the cleaning tank 31 configured to clean the stirring blades or spatula-shaped rods of the stirring mechanisms 15 and 16 is provided between the reaction disk 11 and the stirring mechanisms 15 and 16 to prevent contamination.

FIG. 2 is a diagram of a schematic configuration of the ISE measurement unit 32 according to Embodiment 1.

The ISE measurement unit 32 is a measurement unit configured to measure concentrations of electrolytes, for example, $Na^+$, $K^+$, $Cl^+$ ions and the like in the sample by using an ion selective electrode, and is arranged around the reaction disk 11 as shown in FIG. 1.

As shown in FIG. 2, the ISE measurement unit 32 includes the dilution tank 33, a syringe 106 for diluent, a solenoid valve 107 for diluent, an ISE shipper syringe 108, a solenoid valve 109 for a shipper syringe, a pinch valve 110, a $Na^+$ selective electrode 111, a $K^+$ selective electrode 112, a $Cl^-$ selective electrode 113, a solenoid valve 115 for a reference electrode liquid, a reference electrode 116, a syringe 118 for an internal standard solution, and a solenoid valve 119 for an internal standard solution.

A diluent bottle 105 contains a diluent used for diluting the sample for ISE measurement. The diluent is fed to the dilution tank 33 by operations of the syringe 106 for diluent and the solenoid valve 107 for diluent to dilute the sample in the dilution tank 33.

The sample diluted in the dilution tank 33 is attracted by the $Na^+$ selective electrode 111, the $K^+$ selective electrode 112, and the $Cl^-$ selective electrode 113 by operations of the ISE shipper syringe 108, the solenoid valve 109 for a shipper syringe and the pinch valve 110.

Further, a reference electrode liquid contained in a reference electrode liquid bottle 114 is attracted by the reference electrode 116 by operations of the solenoid valve 115 for a reference electrode liquid, the shipper syringe 108 and the solenoid valve 109 for a shipper syringe. Electromotive forces between the reference electrode 116 and each of ion selective electrodes 111, 112 and 113 are measured.

In a measurement of an internal standard solution used to obtain a sample concentration, by operations of the syringe 118 for an internal standard solution and the solenoid valve 119 for an internal standard solution, an internal standard solution contained in an internal standard solution bottle 117 is fed to the dilution tank 33 from which the sample and the diluent are excluded.

The internal standard solution in the dilution tank 33 is attracted by the $Na^+$ selective electrode 111, the $K^+$ selective electrode 112 and the $Cl^-$ selective electrode 113 by operations of the shipper syringe 108, the solenoid valve 109 for a shipper syringe and the pinch valve 110, and the electromotive force between the reference electrode 116 and each ion selective electrode is measured.

Hereinafter, when the electromotive force is simply described, it means the electromotive force between the reference electrode 116 and each ion selective electrode.

The $Na^+$ selective electrode 111, the $K^+$ selective electrode 112, the $Cl^-$ selective electrode 113 and the reference electrode 116 are connected to the control device 40, and measurement results are output.

Returning to FIG. 1, the pH measurement mechanism 34 for measuring pH of the sample is provided at a downstream side with respect to the sample dispensing mechanisms 21 and 22.

Therefore, the conveyance mechanism 27, the sample dispensing mechanisms 21 and 22 and the pH measurement mechanism 34 are arranged such that the dispensing of the sample for pH measurement by the pH measurement mechanism 34 or the pH measurement is performed after the dispensing of the sample by the sample dispensing mechanisms 21 and 22.

In that case, it is desirable that an operation of the conveyance mechanism 27 is one-way from an upstream side to a downstream side.

Further, a position at which the sample is dispensed for pH measurement by the pH measurement mechanism 34 or a pH measurement position is different from sample dispensing positions by the sample dispensing mechanisms 21 and 22.

The pH measurement mechanism 34 is configured to be rotatable and vertically movable, and for example, is provided with a pH electrode 35 capable of measuring the pH from the sample of 50 μL, and measures the pH of the sample by inserting the electrode into the sample container 25. Since the pH can be directly measured from the sample container 25 in this way, it is not necessary to separately prepare or add a sample for pH measurement. A temperature element (not shown) is provided inside the pH electrode 35.

The pH measurement mechanism 34 is further provided with the dedicated cleaning tank 39 so that the pH electrode 35 can be cleaned with running water.

Further, standard solution bottles 36, 37 and 38 dedicated to calibration are provided around the pH measurement mechanism 34, and immerse the pH electrode 35.

In addition, the pH electrode 35 may be cleaned by sharing the cleaning tanks 23 and 24 of a colorimetric or ISE sample probe. Further, a standard solution may be fed in a sample cup or the like and provided in the sample storage container 26.

The control device 40 is connected to each mechanism in the automatic analysis device 100 described above, and includes a CPU (a control unit 44) that controls overall operation of the automatic analysis device 100.

The control device 40 is a computer including the control unit 44, a memory and the like, and controls various operations of members described above, and performs an arithmetic process of obtaining concentrations of predetermined components in the sample from detection results of the spectrophotometer 14, the $Na^+$ selective electrode 111, the $K^+$ selective electrode 112, the $Cl^-$ selective electrode 113 and the reference electrode 116 as well.

The control of operations of respective devices by the control device 40 is executed based on various programs recorded in a storage device 41. The storage device 41 stores various parameters or information on a sample to be measured (sample type information, and the like) input via an input device 43, measurement results and the like in addition to various programs used for sample measurement.

In addition, control processes of the operations executed by the control device 40 may be integrated into one program, may be divided into a plurality of programs, or may be a combination of these cases. Further, a part or all of the programs may be realized by a dedicated hardware, or may be modularized.

In the control device 40 of the present embodiment, it is desirable to control the sample dispensing mechanisms 21 and 22 such that in particular, a dispensing for measuring an electrolyte concentration is performed before a dispensing for measuring a biochemical item.

A display device 42 is a display capable of displaying a setting screen for ordering a measurement item to be measured for a sample to be measured and a confirmation screen for confirming a measurement result. A user inputs various information by operating the input device 43 such as a keyboard for inputting various instructions based on the setting screen displayed on the display device 42.

When a sample different from the biological sample is measured, a comparison result between theoretical values and measured values of measurement results of the different sample is displayed on the display device 42.

These details will be described later with reference to FIG. 3 and the subsequent drawings.

The above is the overall configuration of the automatic analysis device 100.

An analysis process of a sample by the automatic analysis device 100 as described above is generally performed in the following order.

First, the sample storage container 26 is provided at a carrying unit or the like, and is carried into a sample collecting position of the automatic analysis device 100 by the conveyance mechanism 27.

When the measurement item is a biochemical item, the sample dispensing mechanisms 21 and 22 discharge the aspirated sample into the reaction vessels 12 on the reaction disk 11, the reagent aspirated from the reagent bottle 20 on the reagent disk 19 is further added to the reaction vessels 12 by the reagent dispensing mechanisms 17 and 18, and the sample and the reagent are mixed and stirred in the reaction vessels 12 by the stirring mechanisms 15 and 16.

Then, the spectrophotometer 14 measures optical properties of light passing through the reaction solution stored in the reaction vessels 12 from the light source 14*a*, and transmits measurement results to the control device 40.

On the other hand, when the requested measurement item is an electrolyte item, the sample dispensing mechanisms 21 and 22 discharge the aspirated sample into the dilution tank 33 of the ISE measurement unit 32, the electromotive forces by the ion selection electrodes 111, 112 and 113 are measured, and measurement results is transmitted to the control device 40. However, in the case of electrolyte item measurement, the electromotive force of a known concentration of the internal standard solution is measured before dispensing the sample.

Further, when the requested measurement item is a pH item, the sample storage container 26 is conveyed by the conveyance mechanism 27 to an access position of the pH electrode 35 of the pH measurement mechanism 34 which is provided at a further downstream side with respect to the dispensing positions of the sample dispensing mechanisms 21 and 22, the pH is measured by the pH measurement mechanism 34, and the measurement result is transmitted to the control device 40.

The control unit 44 of the control device 40 obtains a concentration of a specific component in the sample by an arithmetic process based on the transmitted measurement results. The user is notified of an analysis result via the display device 42 and the analysis result is recorded in the storage device 41.

Next, operations at the time of analysis by the automatic analysis device 100 of the present embodiment and examples of screens displayed on the display device 42 at that time will be described with reference to FIGS. 3 to 9. Operations shown below are executed by the control unit 44 of the control device 40 for one analysis cycle.

FIG. 3 shows an operation flowchart of the automatic analysis device according to Embodiment 1. FIG. 4 is a diagram showing an example of the screen of step S406 shown in FIG. 3, FIG. 5 is a diagram showing an example of an ISE calib result screen of step S401 or step S407 shown in FIG. 3, FIG. 6 is a diagram showing an example of a colorimetric calib result screen of step S401 or step S407 shown in FIG. 3, FIG. 7 is a diagram showing an example of a pH measurement calib result screen of step S401 or step S407 shown in FIG. 3, FIG. 8 is a diagram showing an example of a dialysate sample on a screen of step S408 shown in FIG. 3, and FIG. 9 is a diagram showing an example of a screen of step S413 shown in FIG. 3.

In the present embodiment, a dialysate is used as an example of the sample other than biological samples.

First, the control unit 44 determines whether a sample to be analyzed input by a user is a biological sample or a dialysate (step S400). When the sample is determined to be a biological sample, the process proceeds to step S401, and if the sample is determined to be a dialysate, the process proceeds to step S406.

When the sample is determined to be a biological sample in step S400, the control unit 44 first performs a calibration of a planned measurement item as necessary (step S401).

Then, the control unit 44 specifies an item to be separately measured for the sample input by the user (step S402), and starts an operation of biological sample measurement (step S403).

First, the sample is dispensed into the reaction vessel 12 or the dilution tank 33 (step S404), when the measurement is completed, a measurement result is output (step S405).

Here, a dialysate used for dialysis treatment is a dialysate completed for the first time by diluting and mixing a dialysis agent sold by a pharmaceutical company immediately before being used in the field. The dialysis agent to be used may be liquid or powdery, and a component concentration of the adjusted dialysate is described in the attached document as a theoretical value. A dialysate mode described here refers to a mode in which only preset items such as $Na^+$, $K^+$, $Cl^-$, $HCO_3^-$ and pH in the dialysate are measured. It is also possible to request the above items individually or in combination.

When the dialysate is measured, a theoretical value and a determination criterion for each measurement item can be input in advance by the screen as shown in FIG. 4 before the start of analysis (step S406). This step S406 is an optional step and can be omitted.

As shown in FIG. 4, when the user wants to automatically determine measured values regarding items with a theoretical value, the user can input the items to be determined, theoretical values, and determination criterions on the screen in this step. The items are selected from items registered in the automatic analysis device 100 in advance, and the theoretical values and the determination criterions are manually input. A plurality of types of dialysates can be registered.

Here, since the dialysates have different components and properties from the biological sample, reactivity is different in ISE and colorimetric items. Therefore, it is necessary to separately perform a calibration and make a calibration curve for a dialysate regarding the dialysate and a calibration curve for a biological sample regarding the biological sample.

Therefore, the control unit 44 separately performs a calibration for measurement items on a dialysate with respect to biological sample items, if necessary (step S407).

A calibration for pH measurement in step S407 uses, for example, a neutral phosphate standard solution with pH 6.86 at 25° C. as a neutral standard solution, an acidic salt standard solution with pH 4.01 at 25° C. or an oxalate standard solution with pH 1.68 at 25° C. as an acidic standard solution, and a borate standard solution with pH of 9.18 at 25° C. as an alkaline standard solution. These standard solutions are provided at provided positions as the standard solution bottles 36, 37, and 38 in FIG. 1, respectively.

The pH electrode 35 is immersed into the standard solutions in an order of neutral, acidic, and alkaline to adjust a value with respect to a temperature of a pH standard solution. For each measurement of each standard solution, the pH electrode 35 is cleaned with running water in the cleaning tank 39 so that the previous solution is prevented from being carried into the next standard solution or sample. Further, these standard solutions are fed in the sample containers 25 and placed on the sample storage container 26, so that the calibration can also be performed by immersing the pH electrode 35 in the standard solutions when the sample storage container approaches the pH measurement mechanism, and the user can select the standard solutions.

In step S407, when calibrations different for the dialysate item and the biological sample item are performed in the ISE measurement unit 32, results thereof are displayed in a distinguishable manner as shown in FIG. 5.

Further, when calibrations different for the dialysate item and the biological sample item are performed by the spectrophotometer 14, results thereof are displayed in a distinguishable manner as shown in FIG. 6.

In addition, as shown in FIG. 7, the electromotive force and the temperature measured by the automatic analysis device 100 are displayed together with display values of the standard solutions input in advance.

Then, the control unit 44 specifies an item to be separately measured for the sample input by the user with the screen shown in FIG. 8 (step S408), and starts an operation of dialysate measurement (step S409).

In order to proceed to this step S409, the user selects and registers measurement items for the dialysate samples as shown in FIG. 8 from this screen.

The items registered in the automatic analysis device are assigned and set to item keys arranged in the lower center of each screen in advance. First, when a dialysate A registered in FIG. 4 in advance is selected from a pull-down portion of sample types, the dialysate mode is set, and only the items registered for the dialysate A in FIG. 4 can be selected. At this time, the items registered as items for the biological sample cannot be selected.

As a measurement operation, first, the sample is dispensed into the dilution tank 33 or the reaction vessel 12 for the ISE item and the colorimetric item (step S410). In this step S410 or step S404 described above, it is desirable that the dispensing for an ISE analysis item is performed before the dispensing for a colorimetric analysis item.

After the dispensing for the ISE item or the like is completed, the control unit 44 determines whether the measurement items input in step S408 include the pH measurement (step S410A). If it is determined that the pH measurement is included, the process proceeds to step S411, and if it is determined that the pH measurement is not included, the process proceeds to step S414.

Then, if the requested items include the pH measurement, the pH measurement is performed by the pH measurement mechanism 34 (step S411), and the measurement result is output to the control unit 44 (step S412).

In addition, if the theoretical values and the determination criterions are input in step S406, the accuracy of the measurement results on $Na^+$, $K^+$, $Cl^-$, $HCO_3^-$, and pH with respect to the theoretical values are automatically calculated, and further a determination result of whether the criterions are satisfied is obtained, and the screen as shown in FIG. 9 is displayed on the display device 42 (step S413).

In this step, as shown in FIG. 9, the measurement results for one measured dialysate sample are displayed, and the determination results for the theoretical values and the determination criterions registered in step S406 are also displayed in combination.

On the other hand, if the requested items do not include the pH measurement, the measurement results of the ISE item and the colorimetric item are output to the control unit 44 (step S414). Then, as in step S413, the accuracy and the determinations of the measurement results with respect to the theoretical values are automatically calculated in step S413 and the determination results of whether the criterions are satisfied is obtained (step S415).

After step S413 or step S415, the control unit 44 determines whether the determination results of whether the criterions are satisfied include a determination NG (step 416). If it is determined that the determination NG is included, the process proceeds to step S417, and an alarm is output (step S417). On the other hand, if it is determined that the determination NG is not included, the process ends.

Here, when step S406 is omitted as described above, step S413 or step S415, step S416, and step S417 are omitted, and the process can be terminated by step S412 or step S414.

Further, step S413 and step S415 can be selected to not be set if the user does not desire the setting.

Next, an effect of the present embodiment will be described.

The automatic analysis device 100 according to Embodiment 1 of the invention described above includes the ISE measurement unit 32 configured to measure an electrolyte concentration of the sample; the spectrophotometer 14 configured to measure a biochemical item of the sample, the pH measurement mechanism 34 configured to measure pH of the sample, the sample dispensing mechanisms 21 and 22 configured to dispense the sample for the measurement by the ISE measurement unit 32 or the spectrophotometer 14 from the container that contains the sample, and the conveyance mechanism 27 configured to convey the container. The conveyance mechanism 27, the sample dispensing mechanisms 21 and 22 and the pH measurement mechanism 34 are arranged such that the dispensing of the sample for pH measurement by the pH measurement mechanism 34 or the pH measurement is performed after the dispensing of the sample by dispensing mechanisms 21 and 22.

The pH electrode 35 is presumed to have a wider contact area with the sample than the sample probes 21*a* and 22*a* and to be easily affected by the carryover. Therefore, by arranging various mechanisms such that the dispensing for the ISE item or the colorimetric item, which is easily affected by the carryover, is performed and then the pH measurement or the dispensing is performed, it is possible to suppress the effects of the carryover and the sample concentration and perform all of the ISE analysis, the colorimetric analysis and the pH measurement in one automatic analysis device without reducing the processing capability when the sample for which the pH measurement is performed and the sample for which the pH measurement is not performed are continuously measured.

Such an arrangement is particularly suitable for medium-sized and small-sized automatic analysis devices.

Further, since the position at which the sample is dispensed for pH measurement by the pH measurement mechanism 34 or the pH measurement position is different from the sample dispensing positions by the sample dispensing mechanisms 21 and 22, it is possible to measure pH without reducing the processing capability on ISE and colorimetric measurements, and an analysis processing capability can be increased more reliably.

Further, since the ISE measurement takes more time than the colorimetric measurement, the control device 40 can surely shorten the time until the final analysis result of the sample is obtained by controlling the sample dispensing mechanisms 21 and 22 such that the dispensing for measuring an electrolyte concentration is performed before the dispensing for measuring a biochemical item.

In addition, the ISE measurement unit 32, the spectrophotometer 14 and the pH measurement mechanism 34 can measure a sample different from the biological sample as the sample, in particular, the different sample is a dialysate, and thus the measurement of items defined as standardized items of a dialysate can be completed in one device, and the burden on the user can be greatly reduced.

Further, the display device 42 capable of displaying the measurement results of the sample is further provided, when the sample different from the biological sample is measured, the user can easily understand the analysis result of the sample other than the biological sample by displaying comparison results between theoretical values and measured values of the measurement results of the different sample on the display device 42, and the convenience for the user can be further improved.

Embodiment 2

An automatic analysis device according to Embodiment 2 of the invention will be described. The same components as those in Embodiment 1 are denoted by the same reference numerals, and the description thereof will be omitted. The same applies to the following embodiments.

In the automatic analysis device according to Embodiment 1 described above, the pH is measured by immersing the pH electrode 35 in the sample container 25, whereas in the automatic analysis device according to Embodiment 2 of the invention, the pH measurement mechanism 34 is arranged at a position where the pH measurement mechanism 34 is also accessible to the reaction vessel 12 containing a reaction solution obtained by mixing and reacting the sample and the reagent for the colorimetric measurement in addition to the sample container 25. For example, the pH measurement mechanism 34 is arranged at the position of the sample dispensing mechanism 22 in FIG. 1.

With such a configuration, the standard solution bottles 36, 37 and 38 dedicated to calibration of the pH measurement mechanism 34 can be arranged inside the reagent disk 19.

In this case, the standard solution is dispensed into the reaction vessel 12 by the reagent dispensing mechanisms 17 and 18, and the calibration is performed in the reaction vessel. Further, the pH can be measured by dispensing the sample on the sample storage container 26 into the reaction vessel 12.

Further, it is more desirable to allow the user to select whether to perform the calibration for pH measurement and the measurement in the reaction vessel 12 or in the sample container 25 (the dedicated standard solution bottles 36, 37 and 38 for the case of calibration).

Here, although the reaction vessel 12 is heated to around 37° C., the sample container 25 is at room temperature. Further, since the pH changes depending on the temperature, the change is input or stored in the device, it is desirable to convert the pH measurement result into a pH value at a constant temperature such as 37° C. or 25° C. depending on the temperatures of the calibration and the measurement, and then output the pH value.

Other configurations and operations are substantially the same as the configurations and operations of the automatic analysis device according to Embodiment 1 described above, and details thereof are omitted.

The automatic analysis device according to Embodiment 2 of the invention also exerts substantially the same effect as that of the automatic analysis device according to Embodiment 1 described above.

In addition, the pH measurement mechanism 34 is arranged at the position where the pH measurement mechanism 34 is also accessible to the reaction vessel containing the reaction solution obtained by mixing and reacting the sample and the reagent for the colorimetric measurement, and thus the pH can be measured without directly inserting the pH electrode 35 into the sample container 25. Therefore, the concern about the carryover in a case of performing re-examination of the sample after the pH measurement can be further reduced as compared with the automatic analysis device according to Embodiment 1. In addition, an effect that an inexpensive analysis device whose configuration is simplified as compared with the automatic analysis device according to Embodiment 1 can be provided can be exerted.

Embodiment 3

An automatic analysis device according to Embodiment 3 of the invention will be described with reference to FIG. 10. FIG. 10 is a diagram of a schematic overall configuration of the automatic analysis device according to Embodiment 3.

An automatic analysis device 200 according to the present embodiment shown in FIG. 10 includes an introduction unit 1, an ID reader 2, a conveyance mechanism 217, an ISE measurement module 32A, a colorimetric measurement module 100A, a pH measurement module 34A, a standby unit 5 configured to put the sample storage container 26 in a standby mode, a carry-out unit 6 configured to carry out the sample storage container 26 and a total management computer 221.

The introduction unit 1 is a unit configured to introduce at least one sample storage container 26 on which the sample container 25 is mounted into the automatic analysis device 200.

A label, a barcode and the like to which a sample ID indicating attribute information (a reception number, a patient name, a requested analysis item, or the like) related to a test sample (the sample) such as blood is recorded are attached to the sample container 25 held by the sample storage container 26. Further, a tag indicating a rack ID which indicates rack identification information such as a rack number is attached to the sample storage container 26.

The sample storage container 26 placed on the introduction unit 1 is conveyed by the conveyance mechanism 217. In this case, the ID reader 2 reads information on the sample ID and a sample rack ID, and sends the information to the total management computer 221.

The conveyance mechanism 217 is a device configured to convey the sample storage container 26 introduced from the introduction unit 1 to the ISE measurement module 32A, the colorimetric measurement module 100A, and the pH measurement module 34A which are subjects according to analysis requests made by the user such as a laboratory technician or a doctor. Further, the conveyance mechanism 217 is a device configured to convey the sample storage container 26 for which analyses by the ISE measurement module 32A, the colorimetric measurement module 100A, and the pH measurement module 34A are completed, or the sample storage container 26 for which no analysis request is made to the standby unit 5 or the carry-out unit 6.

The conveyance mechanism 217 is configured to identify sample storage containers 26 having different shapes, divide a conveyance operation according to the shapes of the sample storage containers 26 and convey the sample storage containers to the ISE measurement module 32A, the colorimetric measurement module 100A, and the pH measurement module 34A.

The specific configuration of the conveyance mechanism 217 is not particularly limited, and various conveyance mechanisms such as belt conveyance, conveyance by a transport robot, and a conveyance using an electromagnetic force, and a combination thereof can be adopted.

The ISE measurement module 32A, the colorimetric measurement module 100A, the pH measurement module 34A are modules configured to execute analyses of the sample in the sample container 25, which is held by the sample storage container 26 conveyed via the conveyance mechanism 217, and are arranged along the conveyance mechanism 217 and have a detachable connection to the conveyance mechanism 217.

Since the schematic configurations of the ISE measurement module 32A and the pH measurement module 34A are substantially the same as that of the ISE measurement unit 32 and the pH measurement mechanism 34 described in Embodiment 1, the details will be omitted. Further, the colorimetric measurement module 100A has substantially the same configuration as a part obtained by excluding the ISE measurement unit 32 and the pH measurement mechanism 34 from the automatic analysis device 100 described in Embodiment 1, and the details thereof will be omitted.

These ISE measurement module 32A, the colorimetric measurement module 100A, and the pH measurement module 34 are provided with a sample dispensing mechanism 21*b* configured to dispense the sample for measurement by the ISE measurement module 32A from the sample container 25, a sample dispensing mechanism 21*c* configured to dispense the sample for measurement by the spectrophotometer 14 of the colorimetric measurement module 100A from the sample container 25, and a sample dispensing mechanism 34*b* configured to dispense the sample for measurement by the pH measurement module 34A from the sample container 25, respectively.

As in Embodiment 1, it is possible to incorporate any one or both of the ISE measurement unit 32 and the pH measurement mechanism 34 into the colorimetric measurement module 100A.

Further, the number of the ISE measurement module 32A, the number of the colorimetric measurement module 100A and the number of the pH measurement module 34A can be optionally set, and at least one of them may be arranged. In the present embodiment, a case where the total number of modules is three is shown.

The total management computer 221 is connected to each mechanism in the automatic analysis device 200 described above, and includes a CPU (a control unit 223) that controls the overall operation of the automatic analysis device 200.

The total management computer 221 is a computer provided with the control unit 223, a memory and the like, controls various operations of members described above, and performs an arithmetic process of obtaining concentrations of predetermined components in the sample from the detection results of the ISE measurement module 32A, the colorimetric measurement module 100A and the pH measurement module 34A.

For example, the overall management computer 221 determines from the requested analysis item which one of the ISE measurement module 32A, the colorimetric measurement module 100A and the pH measurement module 34A perform the measurement based on the attribute information read by the ID reader 2.

In particular, the control unit 223 of the present embodiment controls the conveyance mechanism 217 such that the dispensing of the sample for pH measurement by the pH measurement module 34A or the pH measurement is performed after the dispensing of the sample by the sample dispensing mechanism 21*b* of the ISE measurement module 32A or the dispensing of the sample by the sample dispensing mechanism 21*c* of the colorimetric measurement module 100A.

In addition, it is desirable that the control unit 223 controls the conveyance mechanism 217 such that the dispensing for measuring an electrolyte concentration is performed before the dispensing for measuring a biochemical item.

Further, an input unit 225 constituted of a keyboard and a mouse for inputting necessary information, a display device 224 configured to display various information such as an analysis results or an analysis instruction, a storage device 222, and a printing unit (not shown) configured to print various information including the display screen of FIG. 4 and the like displayed on the display device 224 described above are connected to the overall management computer 221.

The storage device 222 is a recording medium, for example, a semiconductor memory such as a flash memory or a magnetic disk such as an HDD, which records detection information of the sample put into the automatic analysis device 200 or the sample storage container 26, and measurement situations or request information of the ISE measurement module 32A, the colorimetric measurement module 100A, and the pH measurement module 34A. The storage device 222 also records various computer programs and the like for controlling the operations of devices in the automatic analysis device 200 and executing various display processes and the like.

Other configurations and operations are substantially the same as the configurations and operations of the automatic analysis device 100 according to Embodiment 1 described above, and details thereof are omitted.

As in Embodiment 3 of the invention, the automatic analysis device 200 configured to control the conveyance mechanism 217 such that the dispensing of the sample for pH measurement by the pH measurement module 34A or the pH measurement is performed after the dispensing of the sample by the sample dispensing mechanisms 21*b* and 21*c* also exerts the substantially same effect as that of the automatic analysis device 100 according to Embodiment 1 described above.

Such an automatic analysis device is particularly effective in a large-sized analysis device provided with at least one dedicated module for analyzing measurement items and conveyance module.

In addition, the control unit 223 can surely shorten the time until the final analysis result of the sample is obtained by controlling the conveyance mechanism 217 such that the dispensing for measuring an electrolyte concentration is performed before the dispensing for measuring a biochemical item.

<Others>

The invention is not limited to the above embodiments, and includes various modifications. The above embodiments have been described in detail for easy understanding of the invention, and are not necessarily limited to those including all the configurations described above.

A part of a configuration of one embodiment can be replaced with a configuration of another embodiment, and the configuration of the other embodiment can be added to the configuration of the one embodiment. A part of the configuration of each embodiment can be added, deleted, or replaced with another configuration.

REFERENCE SIGN LIST

1 . . . introduction unit
2 . . . ID reader
5 . . . standby unit
6 . . . carry-out unit
11 . . . reaction disk
12 . . . reaction vessel
13 . . . cleaning mechanism
14 . . . spectrophotometer (colorimetric measurement unit)
14*a* . . . light source
15, 16 . . . stirring mechanism
17, 18 . . . reagent dispensing mechanism
17*a*, 18*a* reagent probe
19 . . . reagent disk
20 . . . reagent bottle
21, 21*b*, 21*c*, 22 . . . sample dispensing mechanism (first dispensing unit)
21*a*, 22*a* . . . sample probe
23, 24, 28, 29, 31 . . . cleaning tank
25 . . . sample container
26 . . . sample storage container
27 . . . conveyance mechanism (conveying unit)
32 . . . ISE measurement unit (electrolyte measurement unit)
32A . . . ISE measurement module (electrolyte measurement unit)
33 . . . dilution tank
34 . . . pH measurement mechanism (pH measurement unit)
34A . . . pH measurement module (pH measurement unit)
34*b* . . . sample dispensing mechanism
35 . . . pH electrode
36, 37, 38 . . . standard solution bottle dedicated to pH electrode
39 . . . cleaning tank dedicated to pH electrode
40 . . . control device
41 . . . storage device
42 . . . display device
43 . . . input device
44 . . . control unit
100, 200 . . . automatic analysis device
100A . . . colorimetric measurement module
105 . . . diluent bottle
106 . . . syringe for diluent
107 . . . solenoid valve for diluent
108 . . . ISE shipper syringe
109 . . . solenoid valve for shipper syringe
110 . . . pinch valve
111 . . . $Na^+$ selective electrode
112 . . . $K^+$ selective electrode
113 . . . $Cl^-$ selective electrode
114 . . . reference electrode liquid bottle
115 . . . solenoid valve for reference electrode liquid
116 . . . reference electrode
117 . . . internal standard solution bottle
118 . . . syringe for internal standard solution
119 . . . solenoid valve for internal standard solution
217 . . . conveyance mechanism (conveying unit)
221 . . . total management computer
222 . . . storage device
223 . . . control unit
224 . . . display device
225 . . . input unit

The invention claimed is:

1. An automatic analysis device for automatically performing an analysis of a sample, the device comprising:
an electrolyte measurement unit configured to measure an electrolyte concentration of the sample;
a colorimetric measurement unit configured to measure a biochemical item of the sample;
a pH measurement unit configured to measure pH of the sample;
a reaction disk having a plurality of reaction vessels;
a first dispensing unit configured to perform dispensing of the sample for measurement by at least one of the electrolyte measurement unit and the colorimetric measurement unit from a container containing the sample; and
a conveying unit configured to convey the container only one way from an upstream side to a downstream side,
wherein the first dispensing unit is disposed between the reaction disk and the conveying unit and at least one of the reaction vessels on the reaction disk is within an operable range of the first dispensing unit, and
wherein the first dispensing unit and the pH measurement unit are disposed along the conveying unit such that the pH measurement unit is disposed downstream from the first dispensing unit and a dispensing of the sample for pH measurement by the pH measurement unit or the pH measurement is performed after dispensing of the sample by the first dispensing unit.

2. The automatic analysis device according to claim 1,
wherein a position at which the sample is dispensed for pH measurement by the pH measurement unit or a pH measurement position is different from a sample dispensing position by the first dispensing unit.

3. The automatic analysis device according to claim 1,
wherein the pH measurement unit is arranged at a position where the pH measurement unit is also accessible to a reaction vessel containing a reaction solution obtained by mixing and reacting the sample and a reagent for a colorimetric measurement by the colorimetric measurement unit.

4. The automatic analysis device according to claim 1, further comprising:
a control unit configured to control an operation of a mechanism of the automatic analysis device,
wherein the control unit controls the first dispensing unit such that a dispensing for measuring the electrolyte concentration is performed before a dispensing for measuring the biochemical item.

5. An An automatic analysis device for automatically performing an analysis of a sample, the device comprising:

an electrolyte measurement unit configured to measure an electrolyte concentration of the sample;

a colorimetric measurement unit configured to measure a biochemical item of the sample;

a pH measurement unit configured to measure pH of the sample;

a first dispensing unit configured to perform dispensing of the sample for measurement by at least one of the electrolyte measurement unit and the colorimetric measurement unit from a container containing the sample;

a conveying unit configured to convey the container only one way from an upstream side to a downstream side; and a control unit configured to control an operation of a mechanism of the automatic analysis device, wherein the control unit is configured to:

control the conveying unit such that a dispensing of the sample for pH measurement by the pH measurement unit or the pH measurement is performed after dispensing of the sample by the first dispensing unit.

6. The automatic analysis device according to claim 5, wherein the control unit controls the conveying unit such that a dispensing for measuring the electrolyte concentration is performed before a dispensing for measuring the biochemical item.

7. The automatic analysis device according to claim 1, wherein the electrolyte measurement unit, the colorimetric measurement unit and the pH measurement unit are capable of measuring a sample different from a biological sample as the sample.

8. The automatic analysis device according to claim 7, further comprising:

a display unit configured to display a measurement result of the sample, wherein when the sample different from the biological sample is measured, a comparison result between a theoretical value and a measured value of a measurement result of the different sample is displayed on the display unit.

9. The automatic analysis device according to claim 7, wherein the different sample is a dialysate.

* * * * *